Feb. 23, 1971  R. J. AL  3,565,664
METHODS FOR MASKING SELECTED PORTIONS OF ARTICLES TO BE COATED
Filed Jan. 24, 1968
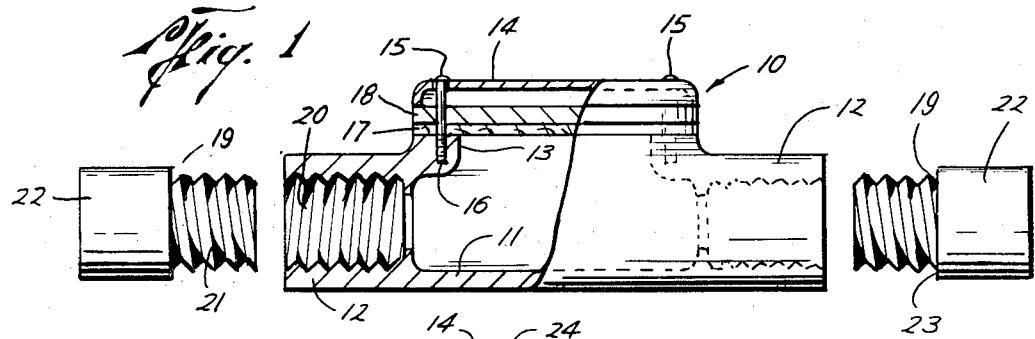
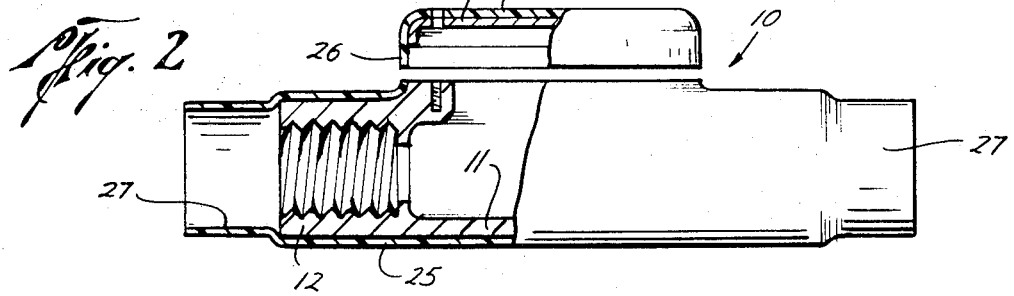
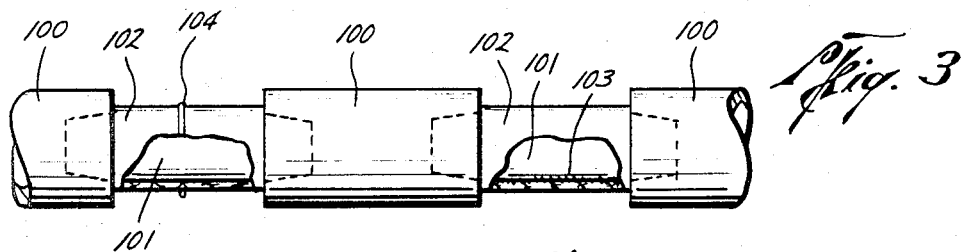
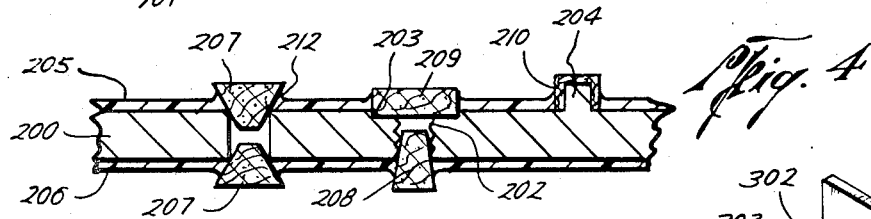
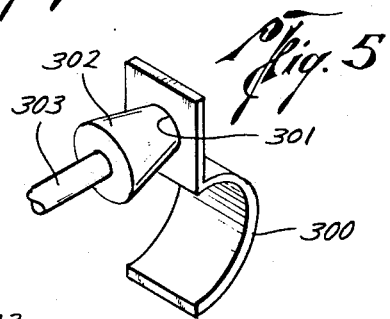
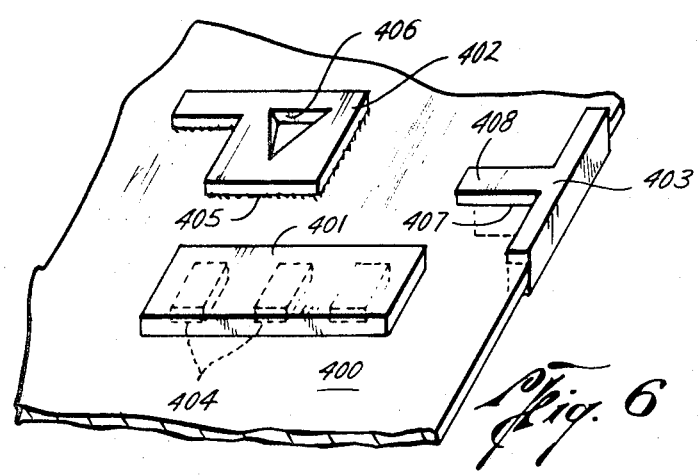
Rene J. Al
INVENTOR.
BY
ATTORNEY

United States Patent Office 3,565,664
Patented Feb. 23, 1971

3,565,664
METHODS FOR MASKING SELECTED PORTIONS OF ARTICLES TO BE COATED
Rene J. Al, Houston, Tex., assignor to Schlumberger Technology, New York, N.Y., a corporation of Texas
Filed Jan. 24, 1968, Ser. No. 700,141
Int. Cl. B44d 1/095
U.S. Cl. 117—18                                          23 Claims

ABSTRACT OF THE DISCLOSURE

The particular embodiments described herein as illustrative of the present invention relate to the masking of particular portions of an article to be coated. More particularly, the present invention as disclosed herein is directed to techniques for masking selected portions of heat-conductive articles that are to be heated and then fusion-coated by application thereto of pulverulent particles of fusible thermoplastic or thermosetting coating materials. After the articles have been coated and the masks are removed, the coatings are terminated in well-defined edges at the boundaries of the masked portions. The mask is made of a low thermal conductivity material which is capable of withstanding prolonged exposure to elevated temperatures such as cork, wood, sheet asbestos and felt and the coating can be applied by a fluidized bed.

It is, of course, quite common to coat articles of metal and other heat-conductive materials by first heating the article to an elevated temperature and then, by one of the typical powder-coating techniques, applying a selected pulverulent coating composition to those surfaces of the heated article that are to be coated. As the pulverulent coating particles approach or contact these heat-releasing surfaces, the particles absorb heat retained by the article and are melted or coalesced thereon to form a continuous fused coating. Where the nature of the coating composition permits, the coated articles are subsequently heated to complete the fusion process and leave an effective protective coating on the substrate surfaces. There are, of course, many well-known techniques for applying such powdered coatings to obtain a desired finished coating and those skilled in the art are fully cognizant of the various ramifications involved to achieve a particular desired result.

It is, of course, recognized that a mask must be used to prevent such powdered coatings from contacting those portions of an article which are not to be coated. This poses somewhat of a problem since no completely satisfactory technique has heretofore been devised for efficiently masking such surfaces. It has been suggested, for example, that those portions of an article which are to be left uncoated be covered with overlays of metal foils or the like before the article is preheated. Although this will prevent the masked surfaces from being coated, the time required to fit and secure such protective foils to the article is usually excessive and makes the technique not at all suitable for mass-production coating of articles having intricately shaped surfaces or openings requiring protection. It is also recognized that this and similar presently-known masking techniques will cause the edges of the coating material to be torn or at least be left irregular when the protective foil or such is removed. This is, of course, not at all desirable.

Other masking techniques proposed heretofore have employed intricately shaped clamps, plugs, and the like, that are quickly engaged with an article as it emerges from a preheating oven to prevent the pulverulent coating materials from contacting the surfaces covered thereby as the heated article is being coated. Since these clamps and the like are not preheated, they will not be coated when the coating materials are brought into contact with the heated article. It will be recognized, of course, that such clamps have, at best, only limited application and are not at all suitable for irregularly-shaped or small articles. Moreover, clamps and fixtures used in these techniques frequently require so much time to be accurately positioned on the heated article that the article will be unduly cooled before it is brought into contact with the coating composition.

Accordingly, it is an object of the present invention to provide new and improved methods for quickly and economically masking selected portions of articles to be powder-coated in such a manner that the coating material will be neatly terminated at the edges of the masks. It is a further object of the present invention to provide new and improved coated articles by using masking techniques that will enable even the most intricately-shaped articles to be selectively masked before powdered coating materials are applied to the heated article.

These and other objects of the present invention are attained by employing an easily formed, inexpensive masking material having a low thermal-absorption capacity as well as being capable of withstanding elevated preheating temperatures typically employed in powder-coating techniques. A preferred material meeting all of these requirements is cork in its various forms. Other materials of this nature that have also been found to be satisfactory are certain woods, and sheets of asbestos and felt.

The novel features of the present invention are set forth with particularity in the appended claims. The operation, together with further objects and advantages thereof, may best be understood by way of illustration and examples of exemplary procedures and embodiments of articles produced thereby when taken in conjunction with the accompanying drawings, in which:

FIG. 1 shows a typical electrical conduit fitting having selected portions thereof masked in accordance with the principles of the present invention;

FIG. 2 depicts the conduit fitting of FIG. 1 after it has been powder-coated and the mask removed; and FIGS. 3–6 show a variety of exemplary arrangements of different masks to better illustrate the numerous situations in which the present invention may be used advantageously.

Turning now to FIG. 1, a typical multi-component electrical conduit fitting, such as a metal junction box 10, is shown temporarily assembled in accordance with the present invention and in readiness for being coated externally by one of the usual fluidized or powder-coating techniques. As is customary, the junction box 10 includes a hollow body 11 having one or more tubular bosses 12 respectively adapted to receive the end of an electrical conduit (not shown). An access opening 13 is provided in the box 10 and adapted to be covered by a closure 14 that is releasably attached to the box as, for example, by screws 15 that pass through the closure and are threadingly secured in tapped bores 16 in the box.

It will be realized that where the coating is to protect the interior of the junction box 10 and its contents from corrosive atmospheres, the external coatings on the body 11 and closure 14 should be formed with cooperatively engageable or mating surfaces that will effect a relatively tight seal when the closure is secured in place. Similarly, since externally coated joints of conduit (not shown) will ultimately be coupled to the junction box 10, it is preferable, if not essential, that relatively tight seals be effected between the mating surfaces of the coating on the box and the external coating on each of the conduits. Furthermore, although these seals will at best be disturbed only infrequently once the various members are connected, it is nevertheless highly desirable that these mating surfaces be capable of being separated and then subsequently reengaged to again effect a tight seal. These objectives have, however, not been successfully attained heretofore in view of the lack of suitable masking techniques which have made it necessary to either coat the members separately or to coat the members while assembled and then carefully sever the coating along the junction of the members. It will, of course, be appreciated that neither of these techniques are particularly feasible for efficient mass-production operations.

The new and improved techniques of the present invention will, however, enable a multi-part heat-conductive article, such as the temporarily assembled junction box 10, to be powder-coated with one of the typical thermoplastic or thermosetting pulverulent compositions in such a manner that the coatings on the various members will provide effective sealing surfaces without having to resort to extra, and often time-consuming, severing operations. Accordingly, to accomplish this, a suitably shaped mask 17 is cut from a flat sheet of cork to fit over the access opening 13 of the body 11 with its outer edges either closely conforming to the marginal edges of the body (as shown in FIG. 1) or else projecting laterally outwardly a short distance therefrom. For reasons that will subsequently become apparent, a flat, thick spacer 18 of a heat-conductive material, such as metal or the like, that conforms generally to the outer peripheral edge of the closure member 14 is placed on top of the cork mask 17. The closure member 14 is then placed on top of the spacer 18 and temporarily fastened to the body 11 by the screws 15 to hold the mask 17 and the spacer in position. End plugs 19 of a heat-conductive material are inserted into the bosses 12 and, if the bosses have internal threads as at 20, secured to the body 11 by external threads 21 on the plugs. By forming the plugs 19 with enlarged-diameter end portions, as at 22, an annular shoulder 23 is provided on each plug for effecting a seat with the mating end surfaces of the bosses 12.

It will be appreciated, of course, that the external surfaces of the body 11 and the closure 14 should be previously cleaned and suitably prepared so as to assure an adequate bonding thereto of the coating that is to be formed on these surfaces. On the other hand, the exposed peripheral edge of the spacer 18 and the exposed surfaces of the end plugs 19 are suitably conditioned to accept but not be adhered to a powder-coating composition either by coating these exposed areas with a suitable nonsticking compound or—depending upon the particular powder-coating composition to be used—by not priming these areas. In any event, these exposed areas are specially conditioned so that a fused coating will be readily built-up thereon but without being bonded to either the enlarged portions 22 of the end plugs 19 or to the exposed edges of the spacer 18. The significance of this latter precaution will subsequently become apparent.

Once all of these various elements are temporarily assembled, they are heated in some convenient manner to a selected temperature above the sintering or melting temperature of a thermoplastic pulverulent composition, such as a vinyl or polyethylene, that is to be applied to achieve a fused, but pliable, coating. Then, before the heated assembly can significantly cool, its exposed external surfaces are contacted with the selected coating composition so that a coating 24 will be formed on the closure 14 and spacer 18 and a coating 25 will be formed on the body 11 and plugs 19 as the pulverulent coating particles are coalesced by the heat given up by the heat-conductive members. The coated assembly is then post-treated as required to complete the treatment of the coatings 24 and 25. The range of practical preheating temperatures, of course, has a lower limit set by the melting or sintering point of the coating material which is adequate to cause adherence to the conditioned substrate surfaces and an upper limit that is determined by the melting, softening, or deterioration temperature of the article being coated as well as by the transient decomposition temperature of the pulverulent coating substance.

Inasmuch as the particular techniques required to obtain a satisfactory final coating are well understood by those skilled in the art of powder-coatings and powder-coating techniques and these details are only incidental to an understanding of the present invention, it is believed sufficient to say only that the coatings 24 and 25 are formed from a selected powder-coating composition that is applied to the properly prepared surfaces of the junction box 10 by any one of the typical powder-coating techniques.

It will be readily appreciated that those portions of the coatings 24 and 25 respectively overlaying the closure 14 and body 11 will be adhered to these members in the usual manner since, as previously discussed, their external surfaces were prepared to insure the bonding of the coatings. Similarly, although the exposed surfaces of the heat-conductive spacer 18 and end plugs 19 were specifically conditioned to not be bonded to the coatings, these heat-conductive members will also release heat to the pulverulent coating composition to form integral, but pliable, extensions of the coatings 24 and 25 that will not be bonded to these members.

Thus, by virtue of these preliminary surface preparations, the coating 24 will be bonded over the entire exterior of the closure 14 and have a depending pliable skirt portion 26 extending completely around the perimeter of the closure. The height of this integral skirt 26 will, of course, be governed by the thickness of the spacer 18. On the other hand, the previous surface preparations will result in the coating 25 being fully bonded around the body 11 and having integral tubular or sleeve-like pliable extensions, as at 27, extending outwardly from the ends of each boss 12. The internal diameter and free length of these pliable sleeves 27 will, of course, be respectively dependent upon the external diameter and the length of the enlarged-diameter portions 22 of the end plugs 19. Thus, once the assembly of FIG. 1 is separated, the coated junction box 10 will appear generally as illustrated in FIG. 2.

The cork mask 17 of the present invention will have been responsible for achieving the well-defined terminations of the coatings 24 and 25 along the upper and lower peripheral edges of the mask. As illustrated in FIG. 2, the edge of the depending skirt 26 will be smoothly and uniformly terminated and will be sharply defined by the junction of the lower face of the spacer 18 and the upper face of the mask 17 during the coating process. Similarly, as seen in FIG. 2, the coating 25 will be smoothly and uniformly terminated around the access opening 13 at the junction of the lower face of the mask 17 with the upper face of the body 11.

These significant results are believed to be substantially, if not wholly, attributable to the very low thermal conductivity of cork. Accordingly, even though the mask 17 is subjected to extreme heat along with the heat-conductive members of the assembly depicted in FIG. 1, when the coating particles are contacted with the heated assembly, the surface temperatures across the exposed edges of the cork mask will be so low that the pulverulent particles of coating composition contacting these exposed edges cannot be coalesced and thereby form a coating thereon. Thus, when the heated assembly is disengaged from the pulverulent particles, there will be no fused coating particles on the exposed edges of the mask 17. It has been found in some instances that a few loose but still pulverulent particles may remain on the exposed surfaces of the mask 17 after the coating process; but these loose particles are easily removed by either blowing or wiping them away. Thus, should the particular coating composition require a subsequent so-called "post-heating" operation, these loose particles should first be removed from the cork mask 17 to prevent the subsequent heating from fusing the loose particles.

It will be appreciated that the extremely close proximity of two opposed heat-releasing surfaces, such as the adjacent faces of the spacer 18 and body 11 separated only by the thickness of the mask 17, will in time tend to cause a bridge of coalesced coating particles to build-up over the exposed edge of the mask and finally link the opposed surfaces. To prevent such bridges, therefore, the mask 17 must either be of sufficient thickness or it must project outwardly a short distance from the body 11 and the spacer 18.

It has been found, however, that a minimum thickness of cork in the order of only about 1/16-inch will usually suffice to prevent bridging even when the exposed edge surfaces of a mask (such as at 17) are flush with the opposed metal surfaces. With the exposed edge of the mask 17 about flush with the adjacent heat-releasing surfaces as seen in FIG. 1, it has been found that the terminal edges of the coatings as at 24 and 25 will tend to be slightly tapered or "feathered" toward the edges of the spacer 18 and body 11 respectively. On the other hand, by sizing a cork mask so as to project outwardly slightly—in the order of about 1/8-inch to 1/4-inch—away from members such as the body 11 and spacer 18, the remote possibility of even an accidental bridge of coating particles being formed between the heat-releasing surfaces 11 and 18 is wholly eliminated. Moreover, it has been found that by projecting the edges of a cork mask beyond adjacent heat-releasing surfaces such as at 11 and 18, the terminal edges of the coatings will tend to build-up or slightly thicken more than the thickness of the major portion of the coatings. It has also been observed that such thicker terminal edges of the coating immediately adjacent to a projecting cork mask will tend to be minutely spaced away from the cork and leave a slight, but distinctive, gap therebetween. In any event, however, the present invention results in the formation of very precise and well-delineated terminations of the final powder-coatings.

Accordingly, as shown in FIG. 2, which the coatings 24 and 25 have been conditioned as, for example, by post-heating, and the mask 17 and spacer 18 are removed, the resulting skirt 26 will provide a pliable seal adapted to complementally fit over the coating 25. In this manner, when the body 11 and closure 14 are assembled, a seal will be formed that is adequate to prevent entrance of corrosive fumes and the like into the interior of the body. Similarly, the sleeves 27 on the bosses 12 will snugly receive the ends of coated conduits (not shown) connected thereto to completely seal the interior of the conduit and junction box 10. Thus, the closure 14 and conduits may be freely removed and replaced without impairing the integrity of the seals provided by the skirt 26 and sleeves 27.

It will, of course, be appreciated that a thermoplastic coating composition that forms a pliable final coating will have to be used to obtain pliable extensions as at 26 and 27 in FIG. 2. This does not mean, however, that the less-pliable coating compositions, such as epoxies or nylon, could not have been used with a mask as at 17. Where such hard coatings are used they will, of course, be terminated along the edges of the closure 14 and body 11. This will, of course, obviate the need for the spacer 18 and the closure 14 will be separated from the body 11 only by a mask, such as at 17, during the coating operation. In such instances, therefore, it is best to size the cork mask so that its edges will be slightly recessed in relation to the body 11 and closure 14 so the coatings will form slight marginal protrusions on the opposed mating surfaces of the body and closure. With such protrusions as these, the coatings will define mating surfaces adapted for sealing engagement with one another when the closure 14 is finally secured to the body 11.

The principles of the present invention are not limited to situations where the cork mask, as at 17, is clamped between opposed heat-releasing surfaces that are to be powder-coated. Thus, as seen in FIG. 3 if, for example, a number of members such as pipe fittings or pipe couplings 100 are to be powder-coated, these members can be tandemly connected, as by nipples 101, to facilitate their handling during the coating operation. To prevent a powder-coating from being built-up on the interconnecting nipples 101, flat sheets 102 of cork are cut to size and wrapped around each nipple and secured thereto, as by an adhesive 103, or by simply being wired in place, as at 104. In either event, the exterior surfaces of the nipples 101 will be fully covered. Thus, once the interconnected assembly as shown in FIG. 3 is heated to a selected elevated temperature, pulverulent coating particles can be applied to the assembly by any of the typical powder-coating procedures to coat the couplings 100 without coating the nipples 101. It will be appreciated, of course, that by using this technique, even long joints of pipe, conduit, and the like that can be tandemly connected in some convenient manner can be externally coated by any suitable powder-coating method.

As still another example of the versatility of the present invention, FIG. 4 is a partial cross-sectional view of a member, such as a flat metal plate 200, that is to be powder-coated. Heretofore, where a member such as the plate 200 has a number of openings and/or protrusions, as at 201-204, it has not been possible to economically coat such a member if these openings or protrusions had to be left uncoated. It has been found, however, that with the present invention, such apertures and/or protrusions, as at 201-204, can be efficiently masked and a powder-coating, as at 205 and 206, readily applied to the uncovered surfaces of the heated member 200.

Accordingly, the plate 200 is shown in FIG. 4 as a figurative example of the ease by which various irregularities can be masked. For example, frusto-conical plugs, as at 207 and 208, of cork can be suitably shaped for partial insertion into the ends of either an untapped bore, as at 201, or a threaded bore, as at 202. It will be recognized that the natural resilience of cork will allow the plugs 207 and 208 to expand to a snug fit in the bores 201 and 202. Moreover, the relative softness of cork will enable the tapered plug 208 to more or less conform to the threads in the tapped bore 202. Where there is a recessed opening, such as the counterbore 203, a cork plug, as at 209, can either be slightly oversized so as to be expanded in place and snugly fit the counterbore or else it can be cut to a close fit and secured therein with an adhesive if need be.

Projections, such as bosses or studs as at 204, can also be easily protected with the present invention. For example, by forming a cork plug, as at 210, with a blind bore that closely receives the stud 204, the stud will be protected during the coating process.

As illustrated in FIG. 4, it has been found that the coatings, as at 205 and 206, will tend to form slight upstanding protrusions or beads, as at 212, around each of the cork masks 207-210. Here again, as previously mentioned, the coating beads 212 will be minutely spaced away from the adjacent surfaces of the cork masks 209-210. Although the reason for this is not known with certainty, it is believed that surface tension may at least be partially responsible for the formation of these slightly spaced protrusions, as at 212. It will be realized, of course, that these protrusions 212 provide a measure of added protection around a coated surface that may be exposed to localized abrasion or wear such as when a bolt (not shown) is being threaded into the tapped bore 202.

Those skilled in the art will, of course, appreciate that where small articles are to be coated by immersion in a fluidized bed, it it more efficient to suspend a number of the articles on a hanger of convenient size. The articles must, of course, be tightly secured so that they cannot fall into the fluidized bed during the coating process. This, however, has presented somewhat of a problem heretofore. For example, where the articles to be coated have an opening into which hooks or the like can be inserted, if a fastener, such as a wire, is looped around each article, the fastener will either cover part of the surface to be coated or there is a chance that the freshly coated articles will shift and touch the fasteners while the coatings are still soft-tacky and mar the still-tacky coatings. On the other hand, if the hanger is provided with specially shaped projections to snugly fit the openings in the articles, the projections must be cleaned after each coating process to insure their subsequent fit to the next articles.

Accordingly, to solve such problems, a typical arrangement is shown in FIG. 5 of how the principles of the present invention can be used to provide improved hangers or supports for holding small articles that are to be powder-coated as, for example, by immersion in a typical fluidized bed (not shown) of pulverulent coating particles. As seen there, one of several small articles to be coated, such as a typical conduit clamp 300, which has an opening 301 therein is efficiently supported by a shaped plug 302 of cork that has one end inserted into the opening and has its other end impaled on a stud 303 projecting from a typical hanger (not shown).

It will be appreciated, therefore, that with the arrangement shown in FIG. 5, the clamps 300 will be securely held. Moreover, since the cork plugs 302 will not accept a coating, neither the hanger nor its projecting studs 303 will have to be cleaned for further service. Furthermore, the clamps 300 can be quickly mounted and removed from the cork plugs 302; and, when necessary, the cork plugs can also be easily replaced. It will be recognized, of course, that the arrangement shown in FIG. 5 is only exemplary and that other similar or different arrangements employing a cork-covered hanger can be readily devised to accommodate any number and varieties of relatively small or large articles. Moreover, larger articles can be easily supported by a plurality of appropriately sized and arranged cork-covered hangers. For example, the plate 200 shown in FIG. 4 could be readily supported from any one or more of the cork masks 207–210.

Still another example of the versatility of the present invention is illustrated in FIG. 6. Assuming that a plate, such as at 400, is to be powder-coated only on selected surfaces thereof, cork masks as at 401–403 can be simply cut to desired sizes and shapes and mounted as required on the plate 400 before it is preheated. As one example of how to mount a mask, one or more magnets 404 are embedded in the mask 401 to hold it in a selected position on a ferromagnetic plate such as at 400. On the other hand, a suitable heat-resistant adhesive, such as an epoxy, can be used, as at 405, to secure the mask 402 in position. It will be noted that, if desired, openings, as at 406, of any shape can be formed in the mask 402 so that the surface of the plate 400 exposed by the opening can be coated.

Although the masks of the present invention are particularly useful for masking surfaces and plugging holes such as those already discussed in relation to FIGS. 1–5, it should be recognized that an edge of a member, such as the plate 400, can also be masked. For example, in FIG. 6, the plate 400 is shown as having an irregularly-shaped opening which may either be in a central portion of the plate or along one edge thereof as shown at 407. Thus, assuming that the irregular opening or notch 407 must for some reason have its edges protected, a cork mask as at 403 can be cut to fit and inserted therein. The mask 403 can, of course, be either sized to expand into a snug fit into the notch 407 or adhesive could be used to secure it in place. Moreover, if the particular circumstances required an adjacent surface of the plate 400 to be masked, the mask 403 could be arranged to include a projection, as at 408, to overlay the adjacent surface.

It will be appreciated that the foregoing descriptions have been directed to a wide variety of exemplary situations where the cork masks of the present invention can be readily employed to mask selected surfaces and portions of an article to be powder-coated on its exposed portions. The ease with which cork can be formed into a desired shape as well as its availability are, of course, of significance.

It should be emphasized, however, that selection of cork as the preferred material is not an arbitrary matter since the masks used in practicing the present invention must be of a material that (1) has a low thermal conductivity; (2) will be capable of withstanding elevated temperatures in the order of about 300 to 600° F. for periods up to about 15 to 45-minutes without being charred, warped or distorted, or otherwise physically degraded; and (3) can be readily shaped. It will also be appreciated that some situations will dictate that the masking material also has a relatively low coefficient of thermal expansion so that its dimensions will not unduly change over the wide range of temperattures typically experienced during a powder-coating operation. As far as can be determined, cork in its various commercially available forms meets all of these requirements and is far superior to any other material.

It has been found, however, that felt and asbestos sheets as well as those woods that are not appreciably charred by the above-mentioned temperatures will also perform satisfactorily so long as these materials are of adequate thickness to sufficiently retard transfer of heat from the protected heat-releasing surfaces so that the outer surface temperatures of the masking material will remain below the sintering temperature of the pulverulent coating composition as the article is being coated. It will be noted that each of these alternative materials have thermal conductivities no greater than about 1.0 to 1.5-B.t.u./(hr.) (sq. ft.) (° F. per inch). Thus, since cork has a thermal conductivity of only about 0.30-B.t.u./(hr.) (sq. ft) (° F. per inch) and wood, asbestos, and felt have thermal conductivities of about three to five times greater than that of cork, in most situations, when everything is considered, cork is by far the superior material.

It will be recognized that it is of particular significance to the present invention to employ a masking material that has a sufficiently low thermal conductivity that the mask will not absorb any appreciable amount of heat as the masked article is being preheated. Moreover, as the article is being coated, the masks must also have a sufficiently low thermal conductivity that the heat being released from the article will not raise the surface temperature of an already-heated mask to a point above the sintering temperature of the coating composition. Coating of a mask will, of course, be more likely to occur around the edges of a given mask, and particularly so, those edges immediately adjacent to the exposed surfaces of the heated article.

As a practical illustration of the significance of the thermal conductivity of the masking material, in those instances where cork has been used to mask an article that is to be coated by immersion in a typical fluidized bed, the outer surface temperatures of the masks are sufficiently low that the masks are cool to the touch even immediately after the article is removed from a preheating oven. Moreover, even for those heated articles with sufficient mass to retain a significant quantity of heat that is, of course, released as the article is being coated, in no instance has it been found that a fused coating is formed on even those edges of a cork mask that are immediately adjacent to the heated article. These desirable results are believed to be directly related to the particularly low thermal conductivity of cork.

On the other hand, where a wooden mask is used, it has been observed in situations otherwise similar to those just described in relation to cork masks that the outer surfaces of the wooden masks are all but uncomfortably hot to the touch. Moreover, even though where the wooden mask is of sufficient thickness to prevent the coating material from coalescing on its outermost surface, powder-coatings will often tend to build-up on those edges of the wooden mask immediately adjacent to the heated surfaces of the article and leave a slightly irregular termination of the coating. These observations would seem to confirm the significance of the thermal conductivity of the masking material since woods have substantially higher thermal conductivities than cork.

It should be pointed out that at least the edges of the masks most proximate to the heated aricle should be relatively smooth. For example, with even a cork mask, it has been observed that at least a partially fused coating may be formed along a particularly rough or porous edge of a mask. In the case of cork, it is believed that pulverulent coating particles may be trapped in a recessed pore space and be coalesced by transfer of heat from the article to the trapped particles by way of conduction through other particles as they move between the article and the trapped particles. This problem is substantially increased along rough end-grain edges of wooden masks since there is probably some heat conduction through the edge or corner portions of the wood that accentuates the problem. Thus, the texture of the edge surfaces of the masks may, in some instances, play some part in the successful practice of the present invention.

Accordingly, it will be recognized that the present invention will allow selected surfaces and/or portions of an article that is to be powder-coated to be masked before the article is heated. In this manner, the resulting coating will have well-defined delineations at the edges or boundaries of the masked areas. Intricately shaped or regularly formed surfaces or openings can be easily covered quickly and with a minimum of expense so as to allow powder-coatings to be used is situations previously considered to be impractical. Thus, the practice of the new and improved methods of the present invention will provide new and improved powder-coated articles in an economical and efficient manner.

While particular embodiments of the present invention have been shown and described, it is apparent that changes and modifications may be made without departing from this invention in its broader aspects; and, therefore, the aim in the appended claims is to cover all such changes and modifications as fall within the true spirit and scope of this invention.

What is claimed is:

1. A method for coating a selected portion of an article made of a heat-conductive material and comprising the steps of: securing a mask of an imperforate material capable of withstanding prolonged exposure to elevated temperatures greater that the sintering temperature of a selected pulverulent coating composition as well as having a thermal conductivity no greater than about 1.5-B.t.u./(hr.)(sq. ft.)(° F. per inch) to a first portion of said article to isolate said first portion of said article from a second portion thereof that is to be coated; heating said article with said mask thereon to bring said article to an elevated temperature greater than said sintering temperature; and before said article has cooled below said sintering temperature, applying said selected coating composition to said second portion of said article and at least the adjacent portions of said imperforate material to coat said second portion of said article with a continuous coating of said selected coating composition before said mask is removed from said article to uncover said first portion thereof.

2. The method of claim 1 wherein said imperforate material is selected from a group consisting of cork, wood, sheet asbestos and felt.

3. The method of claim 1 wherein said imperforate material is predominately of cork.

4. The method of claim 1 wherein said imperforate material is wood.

5. The method of claim 1 wherein said imperforate material is sheet asbestos.

6. The method of claim 1 wherein said imperforate material is felt.

7. The method of claim 1 wherein said imperforate material has a thermal conductivity no greater than about 0.30-B.t.u./(hr.)(sq. ft.)(° F. per inch).

8. The method of claim 7 wherein said imperforate material is composed substantially of cork.

9. A method for coating a selected surface of an article made of a heat-conductive material and comprising the steps of: securing a mask of an imperforate material selected from a group consisting of cork, wood, sheet asbestos and felt to a first surface of said article to isolate said first surface from a second surface of said article that is to be coated; heating said article with said mask thereon to bring said article to an elevated temperature greater than the sintering temperature of a selected pulverulent coating composition; and before said article has cooled below said sintering temperature, immersing said article with said mask thereon in a fluidized bed of said selected coating composition for a sufficient period of time to coat said second surface of said article with a coating of said selected coating composition and leave said first surface of said article uncoated.

10. A method for coating the exterior of a body having at least two separable members respectively made of a heat-conductive material and adapted to define an enclosure when said two members are assembled comprising the steps of: interposing an imperforate mask of a material capable of withstanding prolonged exposure to elevated temperatures greater than the sintering temperature of a selected pulverulent coating composition as well as having a thermal conductivity no greater than about 0.30-B.t.u./(hr.)(sq. ft.)(° F. per inch) between at least the peripheral portions of said separable members to space said members from one another and define junctions between said mask and said peripheral portions of each of said members; securing said separable members to one another to retain said mask in its interposed positions; heating said body with said mask thereon to bring said body to an elevated temperature greater than said sintering temperature; and before said mask is removed and said body has cooled below said sintering temperature, applying said selected coating composition to the exterior of said body to coat the exterior surfaces of said separable members with continuous coatings of said selected coating composition that are respectively terminated along said junctions.

11. The method of claim 10 wherein said imperforate mask is composed substantially of cork.

12. A method for coating only the outer surfaces of a body made of a heat-conductive material and having at least one aperture therein comprising the steps of: fitting an imperforate member of a material capable of withstanding prolonged exposure to elevated temperatures greater than the sintering temperature of a selected pulverulent coating composition as well as having a thermal conductivity no greater than about 1.5-B.t.u./(hr.)(sq. ft.)(° F. per inch) into said aperture to block entry of a coating material into said aperture; heating said body with said imperforate member thereon to bring said body to an elevated temperature greater than said sintering temperature; and before said body has cooled below said sintering temperature, applying said selected coating composition to said body to coat said outer surfaces thereof with a continuous coating of said selected coating composition before said imperforate member is removed from said aperture.

13. The method of claim 12 further including the step of: securing a handling device to said imperforate member before said body is heated to facilitate handling of said body.

14. The method of claim 12 wherein said imperforate member is selected from a group consisting of cork, wood, sheet asbestos and felt.

15. The method of claim 12 wherein said imperforate member is composed substantially of cork.

16. A method for simultaneously coating the outer surfaces of at least two tubular members made of a heat-conductive material and comprising the steps of: securing said tubular members to opposite ends of a spacer member made of a heat-conductive material to tandemly couple said tubular members to one another; covering said spacer member with an imperforate body of a material capable of withstanding prolonged exposure to elevated temperatures greater than the sintering temperature of a selected pulverulent coating composition as well as having a thermal conductivity no greater than about 1.5-B.t.u./(hr.)(sq. ft.)(° F. per inch) to protect the outer surfaces of said spacer member; heating said members with said imperforate material thereon to bring said tubular members to an elevated temperature greater than said sintering temperature; and before said imperforate material is removed and said tubular members have cooled below said sintering temperature, applying said selected coating composition to said outer surfaces of said tubular members and the outer surface of said imperforate body to respectively coat said outer surfaces of said tubular members.

17. The method of claim 16 wherein said imperforate material is selected from a group consisting of cork, wood, sheet asbestos and felt.

18. The method of claim 16 wherein said imperforate material is predominately of cork.

19. The method of claim 16 wherein said imperforate material is wood.

20. The method of claim 16 wherein said imperforate material is sheet asbestos.

21. The method of claim 16 wherein said imperforate material is felt.

22. The method of claim 16 wherein said imperforate material has a thermal conductivity no greater than about 0.30-B.t.u./(hr.)(sq. ft.)(° F. per inch).

23. The method of claim 22 wherein said imperforate material is composed substantially of cork.

References Cited

UNITED STATES PATENTS

| | | | |
|---|---|---|---|
| 3,226,245 | 12/1965 | Dettling | 117—21 |
| 2,250,353 | 7/1941 | Brock et al. | 117—25X |
| 2,363,844 | 11/1944 | Duggan | 118—505 |
| 2,371,859 | 3/1945 | Wallace | 118—505 |
| 2,831,455 | 4/1958 | Sadowsky et al. | 118—505 |
| 2,919,218 | 12/1959 | LeMay | 118—504X |
| 2,935,936 | 5/1960 | Woodring et al. | 118—505X |
| 3,028,266 | 4/1962 | Larsh | 118—504X |
| 3,032,433 | 5/1962 | Lewis et al. | 117—38X |
| 3,034,479 | 5/1962 | Larsh et al. | 118—505X |
| 3,099,583 | 7/1963 | McLean | 118—505 |
| 3,185,131 | 5/1965 | Manning | 117—18X |

FOREIGN PATENTS 251,780   5/1964   Australia _____ 117—21

WILLIAM D. MARTIN, Primary Examiner

E. J. CABIC, Assistant Examiner

U.S. Cl. X.R.

117—21, 25, 38; 118—505